United States Patent
Herke et al.

(10) Patent No.: US 8,773,109 B2
(45) Date of Patent: Jul. 8, 2014

(54) SYSTEM, METHOD AND DEVICE FOR MONITORING CAPACITOR CELLS CONNECTED IN SERIES IN A CAPACITOR MODULE

(75) Inventors: Dirk Herke, Großbettlingen (DE); Karsten Barth, Chemnitz (DE); Vit Kocur, Stary Plzenec (CZ)

(73) Assignee: Flextronics International Kft., Tab (HU)

( * ) Notice: Subject to any disclaimer, the term of this patent is extended or adjusted under 35 U.S.C. 154(b) by 294 days.

(21) Appl. No.: 13/126,485

(22) PCT Filed: Apr. 28, 2009

(86) PCT No.: PCT/EP2009/055160
§ 371 (c)(1),
(2), (4) Date: Sep. 20, 2011

(87) PCT Pub. No.: WO2010/060655
PCT Pub. Date: Jun. 3, 2010

(65) Prior Publication Data
US 2012/0001618 A1 Jan. 5, 2012

(30) Foreign Application Priority Data
Nov. 3, 2008 (DE) .......................... 10 2008 056 962

(51) Int. Cl.
*G01R 19/00* (2006.01)
*G01R 27/26* (2006.01)

(52) U.S. Cl.
USPC ........................................ 324/76.11; 324/658

(58) Field of Classification Search
CPC .................. G01R 31/36; H02J 7/00
See application file for complete search history.

(56) References Cited

U.S. PATENT DOCUMENTS

| | | | |
|---|---|---|---|
| 3,648,377 | A | 3/1972 | Greskamp et al. |
| 3,972,380 | A | 8/1976 | Hudson et al. |
| 4,050,770 | A | 9/1977 | Rigo |
| 4,313,025 | A | 1/1982 | Grube, Jr. |
| 5,091,823 | A | 2/1992 | Kanbarg et al. |
| 5,178,403 | A | 1/1993 | Kemner et al. |
| 5,251,721 | A | 10/1993 | Ortenheim |

(Continued)

FOREIGN PATENT DOCUMENTS

| | | |
|---|---|---|
| DE | 102008040018 A1 | 12/2009 |
| EP | 1460744 A2 | 9/2004 |

OTHER PUBLICATIONS

German Office Action (english translation), dated Mar. 5, 2013, file No. 10 2008 062 657.0, Applicant: Flextronics International Kft., 8 pages.

*Primary Examiner* — Vinh Nguyen
(74) *Attorney, Agent, or Firm* — Haverstock & Owens LLP

(57) ABSTRACT

A system for monitoring a plurality of capacitor cells connected in series in a capacitor module which are used as electrical energy stores in an energy storage device and which can be charged in same by a charge current flowing through all the capacitor cells or discharged by a discharge current. The system includes a measuring unit which can determine the voltages applied to the individual capacitor cells by measuring voltages, an evaluation unit which sets a nominal voltage for the capacitor cells, and at least one discharge branch connectable to each capacitor cell and controllable by a discharge control unit which discharges a respective capacitor cell onto said discharge branch depending upon the set nominal voltage and the applied voltage.

21 Claims, 4 Drawing Sheets

(56) References Cited

U.S. PATENT DOCUMENTS

| | | |
|---|---|---|
| 5,545,933 A | 8/1996 | Okamura et al. |
| 5,678,646 A | 10/1997 | Fliege |
| 5,942,728 A | 8/1999 | Chen |
| 5,995,362 A | 11/1999 | Morel et al. |
| 6,185,099 B1 | 2/2001 | Le Gal |
| 6,323,623 B1 * | 11/2001 | Someya et al. ............... 320/166 |
| 6,419,037 B1 | 7/2002 | Kramer et al. |
| 6,935,451 B2 | 8/2005 | Bell et al. |
| 7,016,177 B1 | 3/2006 | Thrap |
| 7,482,816 B2 * | 1/2009 | Odajima et al. ............. 324/548 |
| 7,561,429 B2 | 7/2009 | Yahata et al. |
| 8,240,411 B2 | 8/2012 | Nakatsu et al. |
| 8,258,792 B2 * | 9/2012 | Vandensande ................ 324/426 |
| 2001/0033473 A1 | 10/2001 | Itahashi |
| 2002/0047685 A1 | 4/2002 | Perelle |
| 2003/0210017 A1 | 11/2003 | Tsuji et al. |
| 2005/0225305 A1 * | 10/2005 | Thrap ........................... 323/234 |
| 2006/0194102 A1 | 8/2006 | Keshishian et al. |
| 2008/0049476 A1 | 2/2008 | Azuma |
| 2009/0145674 A1 | 6/2009 | Lee et al. |
| 2009/0167315 A1 * | 7/2009 | Lindsey ........................ 324/522 |
| 2010/0060243 A1 | 3/2010 | Niigaki et al. |
| 2010/0305794 A1 | 12/2010 | Foster |
| 2012/0084033 A1 * | 4/2012 | Liu et al. ........................ 702/65 |

* cited by examiner

SYSTEM, METHOD AND DEVICE FOR MONITORING CAPACITOR CELLS CONNECTED IN SERIES IN A CAPACITOR MODULE

BACKGROUND OF THE INVENTION

1. Field of the Invention

The invention relates to a system for monitoring a plurality of capacitor cells connected in series in a capacitor module which are used as electrical energy stores in an energy storage device and which can be charged in same by a charge current flowing through all the capacitor cells or discharged by a discharge current.

2. Background Information

Capacitor cells connected in series of this type have the problem that their capacity can change due to aging processes or that parasitic discharging can occur and thus disproportionate voltages can ensue for the individual capacitor cells over time which ultimately have a negative impact on the capacitor module's capacity to store energy.

The object of the invention is thus to provide a system for monitoring such capacitor cells which prevents such problems caused by changes to the capacity of individual cells.

SUMMARY OF THE INVENTION

This object is achieved in accordance with the invention by a system of the type described above which comprises a measuring unit which can determine the voltages applied to the individual capacitor cells by measuring voltages, an evaluation unit able to set a nominal voltage for the capacitor cells, and at least one discharge branch connectable to each capacitor cell and controllable by a discharge control unit which discharges a respective capacitor cell onto the discharge branch depending upon the set nominal voltage and the applied voltage.

The advantage of the inventive solution is thus to be seen in providing the possibility of reducing un-equal charging of the capacitor cells and thus improving the capacitor module's energy storage capacity.

Nothing more specific is stated on the operation of the evaluation unit.

Hence, the solution according to the invention provides for the evaluation unit to be able to set an effective nominal voltage for the respective capacitor cell.

There are many different ways to determine such a nominal voltage for the respective capacitor cell.

For example, an effective nominal voltage can be stored in a parameter field as a function of operating time or number of charge cycles.

Another advantageous solution provides for the evaluation unit being able to determine deviations from a mean voltage from the voltages identified on the capacitor cells.

These deviations from the mean voltage value can then be used to decide whether and to what nominal voltage an individual capacitor cell needs to be discharged.

In particular, the deviation from an effective mean voltage also allows an effective voltage to be determined for the respective capacitor cell.

A simple way to determine nominal voltage is setting the mean nominal voltage as the nominal voltage such that the voltage of a capacitor cell exhibiting a higher voltage will in all cases be adjusted to the mean voltage of all the capacitor cells.

If the mean voltage of all the capacitor cells is adjusted in this manner for example multiple times prior to the capacitor module being charged to its maximum full voltage, this then ensures that none of the individual capacitor cells will have a higher voltage than the maximum voltage.

A particularly advantageous embodiment provides for the evaluation unit to be able to determine the nominal voltage for the respective capacitor cell from the identified total voltage of the capacitor module and the maximum voltages designated for charging the capacitor module to its maximum full voltage.

In the simplest case, the nominal voltage can be specified such that the nominal voltage is set only once for capacitor cells exhibiting voltages higher than the maximum voltage upon the capacitor module being fully charged.

Particularly advantageous, however, is for the evaluation unit to determine the nominal voltages for the capacitor cells such that when the capacitor module is charged to maximum full voltage, all the capacitor cells reach maximum voltage at the same time.

To increase the accuracy of the evaluation unit, it is preferably provided for said evaluation unit to factor in the capacity of the individual capacitor cells.

Capacity can thereby be pre-measured and stored in a table.

Particularly advantageous, however, is for the evaluation unit to determine a capacity relation for the capacitor cells by measurement.

The capacity relation thereby indicates the relationship between the total capacity of the capacitor module and the capacity of each individual capacitor cell.

Ideally, the capacity relation is determined by measuring capacitor cell voltage at two different states of charge.

Nothing more specific has yet been stated as to determining the voltages on the capacitor cells.

It would in principle be conceivable to design the measuring unit such that it measures the voltage on each of the capacitor cells directly.

In order to reduce the complexity of measuring all the voltages on all the capacitor cells at the same time, a multiplexing device which switches the measuring unit from capacitor cell to capacitor cell would in this case be conceivable in order to consecutively measure the voltages on the individual capacitor cells.

Another advantageous solution provides for the measuring unit to measure a total voltage of all the capacitor cells of the capacitor module.

It is furthermore preferably provided for the measuring unit to measure voltages at intermediate taps between two respective capacitor cells. The voltages at the intermediate taps allow the possibility of determining the individual voltages on the individual capacitor cells.

One advantageous possibility in particular provides for the measuring unit to measure the voltages between the respective intermediate tap and ground.

A simple way of obtaining the individual voltages applied to the capacitor cells preferably provides for the measuring unit to subtract the voltage measured at the nearest ground-side intermediate tap from the voltage measured at the respective intermediate tap such that the voltage on the capacitor cell arranged between the intermediate tap and the nearest ground-side intermediate tap can be determined.

In principle, the measuring unit can measure all the voltages simultaneously.

In order to provide for the most cost-efficient measuring of the voltages on the intermediate taps possible, the measuring unit is designed so as to measure the voltages at the intermediate taps in consecutive measuring phases.

Measuring the voltages at the intermediate taps in individual measuring phases can preferably be realized by allocating the measuring unit a switch network for connecting the respective intermediate tap to the measuring unit.

Such a switch network is preferably controllable by a decoder.

It is in particular provided for the measuring unit to measure the voltages at all the intermediate taps in measurement cycles synchronized in successive measuring phases.

For example, the measuring unit could continuously determine the voltages of the capacitor cells.

However, in order to not interrupt the operation of the inventive energy storage device unnecessarily, it is preferably provided for the measuring unit to determine the voltages at fixed intervals of time.

The time intervals can thereby be dependent on the total voltage of the capacitor module. For example, given a low total voltage for the capacitor module, the risk is low that one of the capacitor cells will exceed the maximum voltage while the risk is greater the closer the total voltage of the capacitor module comes to the maximum total voltage of the capacitor module.

For this reason, it is preferably provided for the time intervals at which the measuring unit measures the voltages of the capacitor cells to be fixed as a function of a total voltage of the capacitor module.

For example, the time intervals at which the capacitor cell voltages are determined continue to shorten the closer the total voltage of the capacitor module nears the maximum charge voltage.

In conjunction with the previous clarification of the inventive solution, nothing more specific is stated with respect to the discharge branches as provided.

Thus, an advantageous solution provides for a discharge branch to be allocated each capacitor cell.

The discharge branches can thereby be activated together.

It is particularly advantageous for each discharge branch to be individually activatable.

For example, the discharge branches can be activatable in each operating mode of the energy storage device.

However, in order to be able to operate at the lowest possible currents when balancing the capacitor cells, it is preferably provided for the discharge branches to be activatable in a non-charging or non-discharging state.

Such a non-charging or non-discharging state is for example a non-operative state of the energy storage device, for example when the vehicle is not in operation.

Lastly, nothing more specific is stated as to the type of measuring unit in conjunction with the inventive solution.

Further features and advantages of the invention are the subject of the following description as well as the illustrated representation of an embodiment.

DETAILED DESCRIPTION OF AN ILLUSTRATIVE EMBODIMENT

Figure 1:
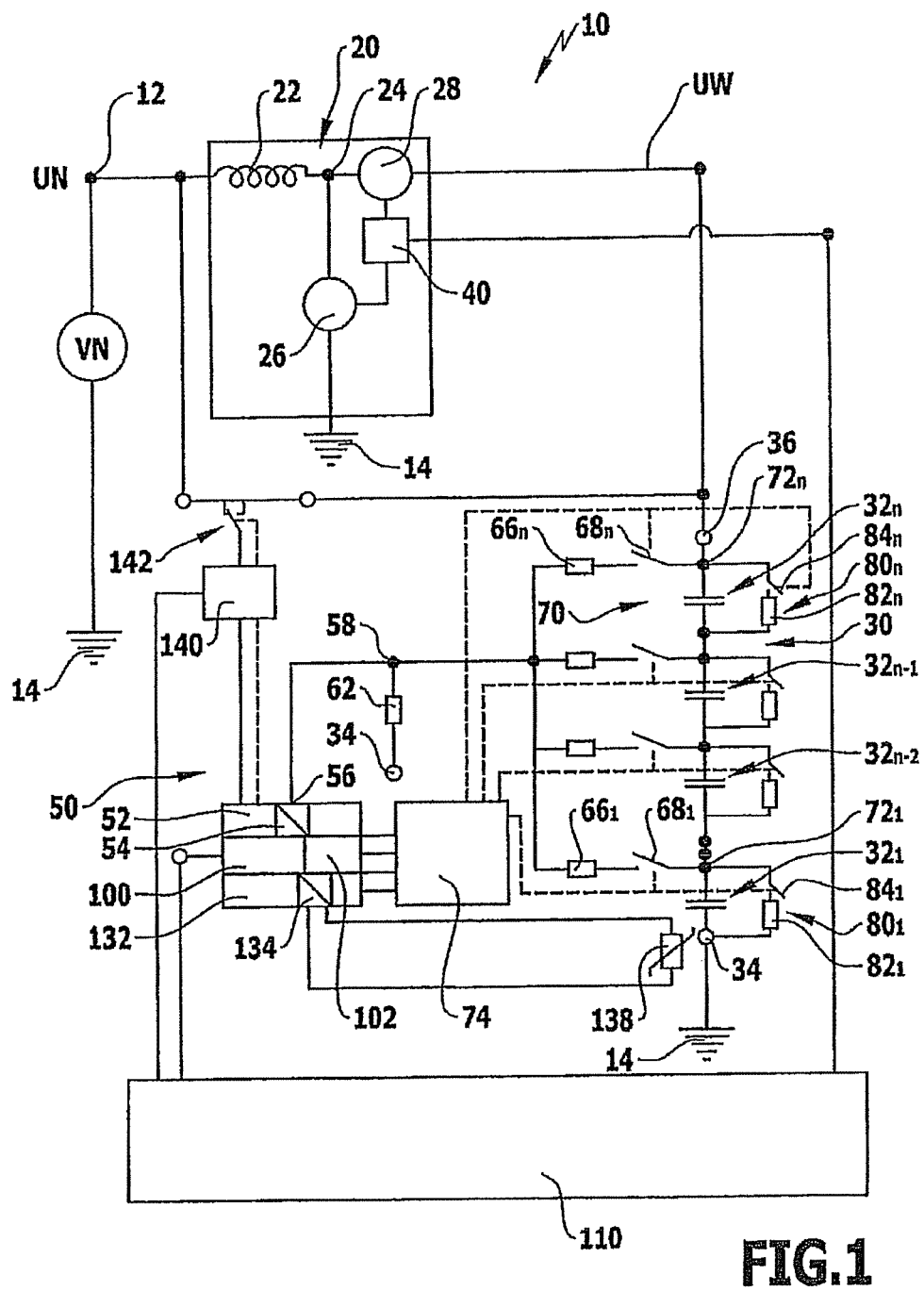
FIG. 1 a schematic circuit diagram of an inventive energy storage device.

An embodiment of the energy storage device 10 according to the invention for storing electrical energy depicted in FIG. 1 comprises a contact 12 connected to a supply network VN, e.g. of a vehicle.

Contact 12 allows the device for storing electrical energy to receive energy from the supply network VN or discharge it to the supply network.

To this end, a voltage transformer is provided, designated as a whole by 20, which can convert the voltage UN in the supply network to a transducer voltage UW differing from said supply network voltage UN.

An example of such a voltage transformer, designed as a Buck-Boost transformer, comprises an inductor 22 connected to contact 12 and a tap 24 on the opposite side of the inductor 22 from the contact, outward from which a first switch 26 is situated between the tap 24 and ground 14 and a second switch 28 is situated between the tap 24 and a capacitor module 30 comprising a plurality of individual capacitor cells 32, connected in series, such that the capacitor module 30 with the series of capacitor cells 32 is situated at a first contact 34 to ground 14 and connected to the second switch 28 by means of a second contact 36.

Electrical energy from the supply network VN can thus be stored in the capacitor module 30 and then fed back to the supply network VN upon a later need for energy in the supply network VN.

The individual capacitor cells 32 are configured for example as electrochemical double-layer capacitors such as those marketed by the Maxwell Technologies company, for example.

The storing and feeding of energy ensues by means of a voltage transformer controller designated as a whole by 40 which alternately controls the switches 26 and 28 at a defined cycle frequency and for different lengths of time as applicable.

To maximize the stored energy of the capacitor module 30, it is necessary for all the capacitor cells $32_1$ to $32_n$ to attain their maximum voltage simultaneously.

It is moreover necessary not to exceed the maximum voltage of the capacitor cells 32 and for the capacitor cells to not be subjected to any negative voltage.

Double-layer capacitor cells are in particular used to store higher energy, however same will vary in terms of their capacity due for example to aging processes or other processes, in consequence of which different voltages will occur in a capacitor module 30 according to the invention in which all the capacitor cells 32 are always charged with the same current or discharged with the same current.

Such differing capacitor cell 32 voltages leads to a reduction of the maximum electrical energy able to be stored in the capacitor module 30.

For this reason, an inventive system 50 is provided to balance the charge states of the plurality of capacitor cells 32 of the capacitor module 30.

Said system 50 comprises a measuring device 52 having an A/D converter 54. A center tap 58 of a voltage divider is thereby situated at an analog input 56 of the A/D converter which on the one hand comprises a first resistor 62 situated between the center tap 58 and the first contact 34 of the capacitor module 30 and has a plurality of second resistors $66_1$ to $66_n$ connectable by means of switches $68_1$ to $68_n$ of a switch network designated as a whole by 70 to intermediate taps $62_1$ to $62_n$ which are each respectively situated on a side of the respective capacitor cell 32 facing away from the first contact 34 of the capacitor module 30 and facing the second contact 36 of the capacitor module 30. The switches $68_1$ to $68_n$ of switch network 70 can thereby be controlled by the decoder designated as a whole by 74.

Each of the individual capacitor cells $32_1$ to $32_n$ is furthermore allocated to a discharge branch $80_1$ to $80_n$ which switches the respective capacitor cells $32_1$ to $32_n$ in parallel and comprises a discharge resistor $82_1$ to $82_n$ as well as switches $84_1$ to $84_n$ in series with the discharge resistor $82_1$ to $82_n$ with which the discharge branch 80 can be activated such that the respective capacitor $32_1$ to $32_n$ can be discharged over the respective discharge branch $80_1$ to $80_n$.

Switches $84_1$ to $84_n$ can also be controlled by means of the decoder 74 and in fact are done so synchronously with switches $68_1$ to $68_n$.

The decoder 74 enables successive measurements of the voltages between the respective intermediate tap 72 and the first contact 34 of the capacitor module 30 in a measurement cycle 90 during individual temporally consecutive measuring phases 92 synchronized on the individual intermediate taps $72_1$ to $72_n$, whereby the voltage measurement ensues by means of the A/D converter 54 measuring the voltage on the intermediate tap 58 of the voltage divider which on the one hand is formed by the first resistor 62 and on the other by the respective second resistor 66 associated with the respective intermediate tap 72.

Figure 2:
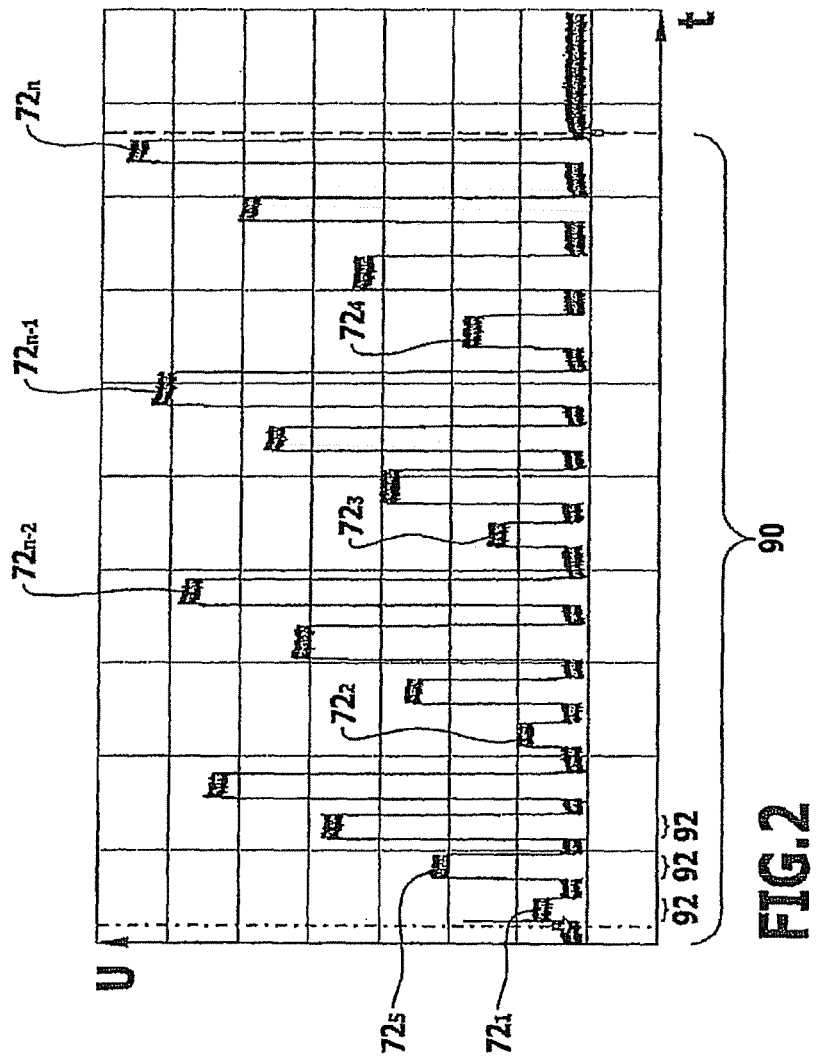
FIG. 2 a measurement cycle representation of voltages at intermediate taps over time.

As FIG. 2 shows, in the example case of 16 capacitor cells 32, the voltage is first measured at intermediate tap $72_1$, then the voltage at intermediate tap $72_5$, then intermediate tap $72_9$, and then at intermediate tap $72_{13}$ and subsequently at intermediate tap $72_2$, at intermediate tap $72_6$, at intermediate tap $72_{10}$ and then at intermediate tap $72_{14}$, etc., until all the voltages on intermediate taps $72_1$ to $72_n$ have been measured.

An evaluation unit 100 is further allocated to the measuring device 52 which evaluates the voltages on the individual capacitor cells $32_1$ and $32_n$ determined by the measuring device 52 and switches in parallel the discharge branches $80_1$ and $80_n$ of one or more of the capacitor cells $32_1$ to $32_n$ as applicable in order to discharge same.

Figure 3:
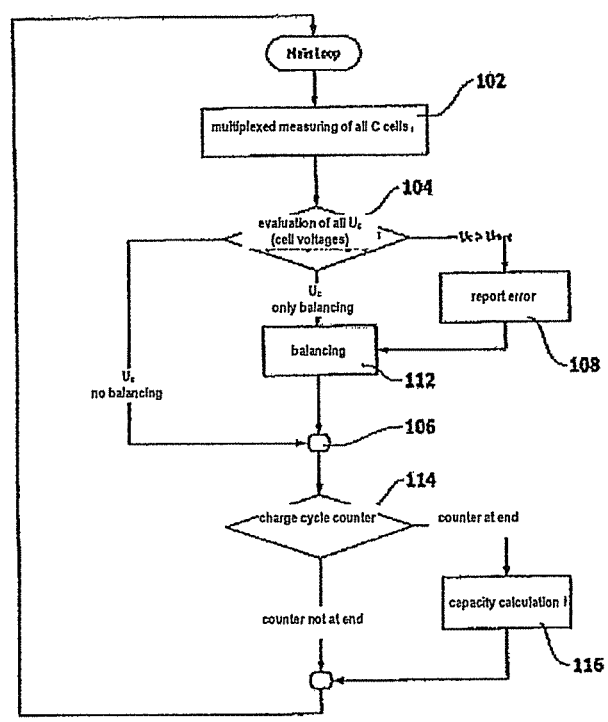
FIG. 3 a flow chart of the operation of the inventive system.

FIG. 3 shows an exemplary interrelation between the measuring device 52 and the evaluation unit 100.

First the voltages on the individual intermediate taps $72_1$ to $72_n$ are measured by the measuring unit 52, as depicted in block 102, whereby these voltages represented in FIG. 2 do not directly furnish the voltages $U_c$ applied to the individual capacitor cells $32_1$ to $32_n$, but rather the voltages of all those capacitor cells 32 situated between the first contact 34 and the respective intermediate tap 72 as shown in FIG. 2.

As depicted in block 104, the measuring device 52 is able to determine the individual voltages $U_c$ applied to the capacitor cells 32 from these voltages.

An evaluation of the individual voltages $U_c$ further ensues in the evaluation unit 100 pursuant block 104. If the individual voltages $U_c$ are all of the same magnitude—as provided for in the ideal case—there is then no need to perform a so-called balancing of the capacitor cells $32_1$ to $32_n$ by activating one or more discharge branches 80, as indicated by the skip to block 106 in FIG. 3.

If, however, one of the individual voltages $U_c$ of one of the capacitor cells 32 is greater than the highest allowable voltage $U_{ch}$ for the respective individual capacitor cells 32, for example greater than 2.85 volts at a rated nominal voltage of 2.7 volts, a skip is made from block 104 to block 108, pursuant which it is communicated to a system control 110 that there is a significant malfunction of the capacitor module 30, upon which the system control 110 of the inventive device for storing electrical energy 10 is taken out of operation, for example by the corresponding control of the voltage transformer controller 40 which shuts the inventive device down by opening both switches 26, 28.

If the voltage $U_{cx}$ of an individual capacitor cell $32_x$ is greater than the mean value of all voltages $U_c$ of all capacitor cells 32, a balancing of this individual capacitor cell $32_x$ occurs, e.g. pursuant block 112; i.e. by discharging the individual capacitor cell $32_x$ by means of its associated discharge branch $80_x$.

This ensues via the control of the respective switch $84_x$ of the respective discharge branch; i.e. by the closing of same such that the respective capacitor cell $32_x$ is discharged, and done so down to a voltage $U_c$ corresponding to the mean value of the voltage $U_{cx}$ on all the capacitor cells 32.

After the balancing pursuant block 112 in FIG. 3, a charge cycle counter in which is fixed the designated maximum number of charge cycles for the capacitor module 30 is read pursuant block 114.

If the number of charge cycles is lower than a maximum value for the charge cycles, the respective measurement cycle is terminated, although it can be restarted.

If the number of charge cycles is greater than a maximum value for the charge cycle counter 114, a capacity calculation for capacitor module 30 then follows pursuant block 116 in FIG. 3 taking the capacities of all the capacitor cells 32 into account, after which it is decided whether the system control 110 should report an error or whether a further measurement cycle 90 should be performed.

Figure 4:
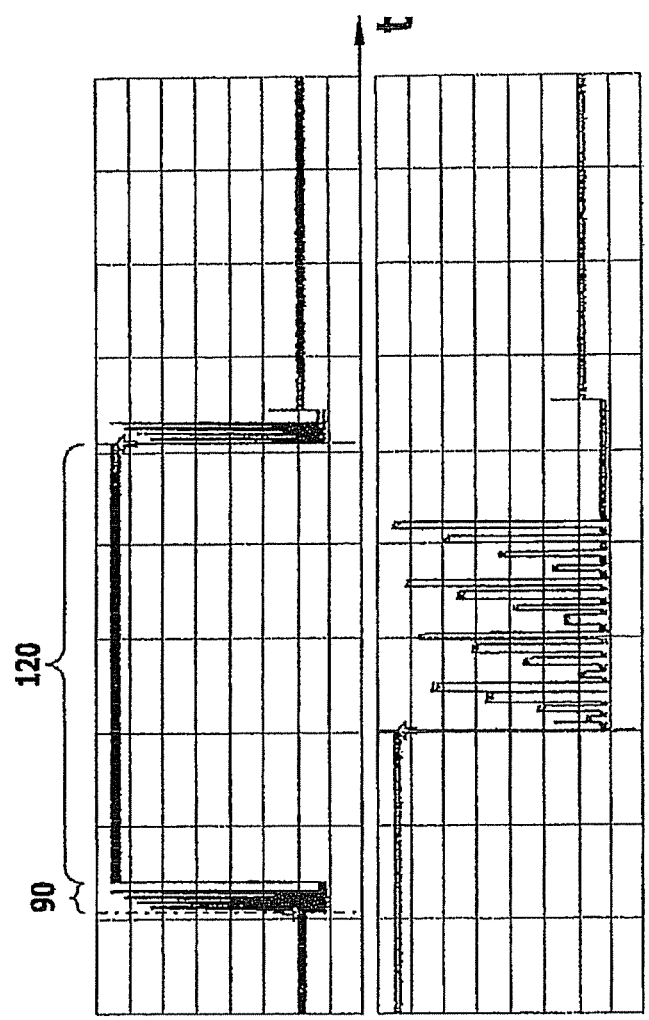
FIG. 4 a representation of measurement cycles and balancing cycles on a time axis.

Such a measurement cycle 90, followed by a balancing cycle 120, is depicted along a time axis in FIG. 4, for example, whereby FIG. 4 shows that the measurement cycle 90 is substantially shorter than the subsequent balancing cycle 120; this being due to the large discharge resistor 82 of the respective discharge branch 80 of the capacitor cells 32 such that long periods of time are needed to discharge the respective capacitor cells 32 to reduce the voltage $U_c$ of same.

In conjunction with the previous clarification of the balancing; i.e. the discharging of the respective capacitor cell $32_x$, how much the respective capacitor cell 32 is to be discharged will not be discussed.

A first conceivable solution provides for an initial approximation to balance when the voltage $U_{cx}$ of the respective capacitor cell $32_x$ is higher than the mean voltage $U_{cm}$ of the capacitor cells 32, in that the respective capacitor cell 32 is discharged to voltage $U_{cm}$ as the nominal voltage such that the voltage of the respective capacitor cell 32 again corresponds to said mean value $U_{cm}$.

The fact that the respective capacitor cell $32_x$ in the given structure of the capacitor module 30 exhibits a higher voltage than the other capacitor cells 32, however, is based on, among other things, for example the capacity of said capacitor cell $32_x$ having changed, for example due to aging, and having become less. In this case, the current flowing through said capacitor cell $32_x$, which is of the same magnitude for all the capacitor cells 32, results in a higher voltage $U_{cx}$ in capacitor cell $32_x$ as in the other capacitor cells 32 of the capacitor module 30 when said capacitor cell $32_x$ is being charged.

If when the capacitor module 30 is being charged to the maximum full voltage $Ug_{max}$, which corresponds to the maximum voltage $U_{cmax}$ of the capacitor cells 32 multiplied by the number of same, the capacitor cells $32_x$ are charged with a higher voltage compared to that of the other capacitor cells 32 by the current flowing through all of said capacitor cells 32, the voltage $U_{cx}$ of the capacitor cell $32_x$ will exceed this voltage $U_{cmax}$ during the course of charging. This in turn has the consequence that the other capacitor cells 32 will not be charged to the maximum voltage $U_{cmax}$ and thus to maximum storage capacity.

For this reason, a second solution for precise balancing provides for the capacitor cells $32_x$ to be set to a nominal voltage $U_{csx}$ which is lower than measured voltage $U_{cx}$. This nominal voltage is defined in this second, more precise solution by the formula:

$$U_{csx}(t1) = U_{cmax} - \frac{Cg}{Cx}(U_{gmax} - U_g(t1))$$

wherein $C_g$ is the total capacity of the capacitor module 30, $C_x$ is the capacitor of the capacitor cell $32_x$, and $U_g(t1)$ is the total voltage of the capacitor module 30 at the respective time point at which the nominal voltage is also to be defined.

To determine the capacities, the evaluation unit 100 determines the capacity of each individual capacitor cell $32_x$ based on two measurement cycles 90.

The capacity relation $$\frac{Cg}{Cx}$$

needed to determine the nominal voltage $U_{cxs}$ can be determined from the voltage measurements according to the following formula:

$$\frac{Cg}{Cx} = \frac{Ucx(ta) - Ucx(tb)}{Ug(ta) - Ug(tb)}$$

whereby $t_a$ and $t_b$ are two different points in time.

Since capacities can only change very slowly, the capacity relation $$\frac{Cg}{Cx}$$

can be determined over long intervals of time, for example over weeks or months.

From this determined capacity relation, the nominal voltage $U_{cs}$ can be determined for each of the capacitor cells 32 to which each of said capacitor cells 32, for example capacitor cell $32_x$ of reduced capacity due to aging, needs to be discharged in order to reach the maximum voltage $U_{cmax}$ in all capacitor cells $32_x$ at the same point in time when charging the entire capacitor module 30, during the course of which the same current flows through all the capacitor cells 32.

In other words, in the case of each capacitor cell $32_x$ having a voltage $U_{cx}$ higher than the lowest voltages $U_{cx}$ of one of the capacitor cells 32, same is discharged by means of the respective discharge branch $80_x$ and controlled by the discharge device 102, to the nominal voltage $U_{cs}$ so as to ensure that during the joint charging of said capacitor cells 32, the maximum voltage $U_{cmax}$ is reached at the same time.

This balancing can in principle be realized at any time with the system 50 according to the invention. Preferably, however, the balancing only takes place in a voltage range which is between approximately a quarter of the maximum total voltage $U_{gmax}$ of the capacitor module 30 and approximately half of the maximum total voltage $U_{gmax}$ of the capacitor module 30.

In the case of relatively low voltage levels for total voltage $U_g$, this balancing enables reaching a balance for the individual capacitor cells $32_x$ in relation to the other capacitor cells 32 with low loss of energy.

Yet the balancing of the individual capacitor cells 32 occurs independently of the monitoring of the voltage $U_c$ of the capacitor cells 32 by the measuring unit 52 cautiously performed in all charge states of the capacitor module 30, whereby a repetition frequency of the measurement cycles 90 depends for example on the total voltage $U_g$ of the capacitor module 30.

For example, there are periods between two measurement cycles 90 on the order of magnitude of 100 to 300 milliseconds at a total voltage $U_g$ to approximately half of the maximum total voltage $U_{gmax}$ while at higher total voltages $U_g$, the periods between two measurement cycles 90 are shortened, for example to values between 40 and 100 milliseconds, in order to ensure that none of the capacitor cells 32 will be charged higher than the maximum value $U_{cmax}$ for one of the capacitor cells 32.

Since the aging processes on capacitor cells 32 in the capacitor module 30 as well as other processes which can lead to damaging the capacitor cells 32 are temperature-dependent, a temperature detecting unit 132 is provided additionally to the measuring unit 52 which reads a temperature sensor 138 via an A/D converter 134 measuring the temperature in the capacitor module 30. If the temperature in the capacitor module 30 exceeds a maximum predefinable temperature, shutdown of the inventive device for storing electrical energy likewise ensues by means of the system control 110 in order to give the capacitor module 30 the opportunity to cool back down to a designated temperature.

In order to be able to conduct the balancing of the individual capacitor cells 32 in the case of stationary vehicles, the system control 110 is provided with a switchable power supply 140 which enables the inventive system to be supplied with energy either via the voltage at the supply network VN or via the voltage of the capacitor module 30. To this end, the power supply 140 controls a toggle switch 142 which ensures the power supply depending on the state.

Thus, the inventive system 50 can also be operated in off-line supply networks VN; i.e. for example stationary vehicles, since the power supply 140 will then be fed by the energy existing within the capacitor module 30.

Hence, there is in particular the possibility of balancing the individual capacitor cells 32 during a time when there is no energy storage from a supply network VN and the supply network VN is also shut down; i.e. when the vehicle is stationary. This has the advantage that the discharge branches 80 can thereby be dimensioned such that only a low current flows through same so that long periods are available in which the individual capacitor cells 32 can be discharged and thus balanced.

What is claimed is:

1. A system for monitoring a plurality of capacitor cells connected in series in a capacitor module which are used as electrical energy stores in an energy storage device and which can be charged in same by a charge current flowing through all the capacitor cells or discharged by a discharge current, the system comprising:

a measuring unit which can determine the voltages applied to the individual capacitor cells by measuring voltages;

an evaluation unit configured to separately determine a nominal voltage for each of the capacitor cells by performing a separate calculation for each of the capacitor cells such that a separate nominal voltage value is determined for each of the capacitor cells; and at least one discharge branch coupled to at least one of the capacitor cells and controllable by a discharge control unit which discharges the at least one of the capacitor cells onto the at least one discharge branch depending upon the set nominal voltage and the applied voltage.

2. The system according to claim 1, characterized in that the evaluation unit determines the nominal voltages for the respective capacitor cells from an identified total voltage of the capacitor module and maximum voltages designated for charging the capacitor module to a maximum full voltage.

3. The system according to claim 2, characterized in that the evaluation unit determines the nominal voltages for the respective capacitor cells such that when the capacitor module is charged to the maximum full voltage, all the capacitor cells reach maximum voltage at the same time.

4. The system according to claim 3, characterized in that the evaluation unit factors in the capacities of the individual capacitor cells.

5. The system according to claim 4, characterized in that the evaluation unit determines a capacity relation for the respective capacitor cells by measurement.

6. The system according to claim 5, characterized in that the evaluation unit determines the capacity relation by measuring the capacitor cell voltages at different states of charge.

7. The system according to claim 6, characterized in that the measuring unit measures a total voltage of all the capacitor cells of the capacitor module.

8. The system according to claim 7, characterized in that the measuring unit measures voltages at intermediate taps between two respective capacitor cells.

9. The system according to claim 8, characterized in that the measuring unit measures the voltages between the respective intermediate tap and ground.

10. The system according to claim 9, characterized in that the measuring unit subtracts the voltage measured at the nearest ground-side intermediate tap from the voltage measured at the respective intermediate tap.

11. The system according to claim 10, characterized in that the measuring unit measures the voltages at the intermediate taps in consecutive measuring phases.

12. The system according to claim 11, characterized in that the measuring unit is allocated a switch network by means of which the respective intermediate tap can be connected to said measuring unit.

13. The system according to claim 12, characterized in that the switch network is controllable by a decoder.

14. The system according to claim 13, characterized in that the measuring unit measures the voltages at the intermediate taps in a measurement cycle synchronized in successive measuring phases.

15. The system according to claim 14, characterized in that the measuring unit determines the voltages at fixed intervals of time.

16. The system according to claim 15, characterized in that the measuring unit measures the voltages of the capacitor cells as a function of a total voltage of the capacitor module.

17. The system according to claim 16, characterized in that each capacitor cell is allocated to a discharge branch.

18. The system according to claim 17, characterized in that each discharge branch is individually activatable.

19. The system according to claim 18, characterized in that the discharge branch can be activated in a non-charging or non-discharging state.

20. A system for monitoring a plurality of capacitor cells connected in series in a capacitor module which are used as electrical energy stores in an energy storage device and which can be charged in same by a charge current flowing through all the capacitor cells or discharged by a discharge current, the system comprising:
 a measuring unit which can determine the voltages applied to the individual capacitor cells by measuring voltages;
 an evaluation unit configured to determine a nominal voltage for each of the capacitor cells, wherein the nominal voltage is a mean voltage of the capacitor cells; and
 at least one discharge branch coupled to at least one of the capacitor cells and controllable by a discharge control unit which discharges the at least one of the capacitor cells onto the at least one discharge branch depending upon the set nominal voltage and the applied voltage.

21. The system according to claim 20, characterized in that the evaluation unit can determine deviations from the mean voltage from the voltages identified on the capacitor cells.

* * * * *